(12) United States Patent
Chaos-Provecho et al.

(10) Patent No.: US 12,190,334 B2
(45) Date of Patent: *Jan. 7, 2025

(54) SYSTEMS AND METHODS TO FACILITATE SYNCHRONIZED SHARING OF CENTRALIZED AUTHENTICATION INFORMATION TO FACILITATE ENTITY VERIFICATION AND RISK ASSESSMENT

(71) Applicant: SIMUR, INC., Grand Cayman (KY)

(72) Inventors: Javier Alejandro Chaos-Provecho, Madrid (ES); Don Seymour, West Bay (KY)

(73) Assignee: SIMUR, INC., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 18/471,503

(22) Filed: Sep. 21, 2023

(65) Prior Publication Data

US 2024/0330963 A1     Oct. 3, 2024

Related U.S. Application Data

(63) Continuation of application No. 18/192,526, filed on Mar. 29, 2023, now Pat. No. 11,816,682.

(51) Int. Cl.
| | | |
|---|---|---|
| *G06Q 10/10* | (2023.01) | |
| *G06Q 10/06* | (2023.01) | |
| *G06Q 30/018* | (2023.01) | |
| *G06Q 30/02* | (2023.01) | |
| *G06Q 40/02* | (2023.01) | |
| *G06Q 40/06* | (2012.01) | |

(52) U.S. Cl.
CPC ......... *G06Q 30/0185* (2013.01); *G06Q 40/02* (2013.01)

(58) Field of Classification Search
CPC .......................... G06Q 30/0185; G06Q 40/02
USPC .......................................... 705/1.1–912, 318
See application file for complete search history.

(56) References Cited

U.S. PATENT DOCUMENTS

| | | |
|---|---|---|
| 6,542,515 B1 | 4/2003 | Kumar |
| 6,757,720 B1 | 6/2004 | Weschler, Jr. |
| 7,593,892 B2 | 9/2009 | Balk |
| 7,899,722 B1 | 3/2011 | Lawrence |
| 7,904,361 B2 | 3/2011 | Lawrence |
| 8,019,691 B2 | 9/2011 | Dominguez |
| 8,140,415 B2 | 3/2012 | Lawrence |

(Continued)

FOREIGN PATENT DOCUMENTS

| | | |
|---|---|---|
| AU | 2021101317 A4 | 5/2021 |
| CN | 105025032 A | 11/2015 |

*Primary Examiner* — Jonathan P Ouellette
(74) *Attorney, Agent, or Firm* — Esplin & Associates, PC

(57) ABSTRACT

Systems and methods to facilitate synchronized sharing of centralized authentication information to facilitate entity verification and/or risk assessment are disclosed. Exemplary implementations may: obtain user profiles for users being assessed for risk by compliance organizations; obtain requests to verify and assess risk of the users; generate user interface information defining a user interface through which content of the user profiles are accessed; effectuate communication of the user interface information to computing platforms associated with compliance organizations; obtain updates to the user profiles; automatically update the user interface information based on the updates to the user profiles so that the instances of the content displayed in the user interface reflects the updates to the user profiles; and/or perform other operations.

20 Claims, 5 Drawing Sheets

(56) References Cited

U.S. PATENT DOCUMENTS

| | | |
|---|---|---|
| 8,209,246 B2 | 6/2012 | Lawrence |
| 8,266,051 B2 | 9/2012 | Lawrence |
| 8,831,972 B2 | 9/2014 | Angell |
| 9,058,581 B2 | 6/2015 | Lawrence |
| 9,934,544 B1 | 4/2018 | Whitfield |
| 10,581,886 B1 | 3/2020 | Sharifi Mehr |
| 10,915,960 B1 | 2/2021 | Johnson |
| 10,942,991 B1 | 3/2021 | Kidd |
| 11,055,772 B1 | 7/2021 | Ram |
| 11,132,460 B2 | 9/2021 | Chen |
| 11,558,377 B2 | 1/2023 | Pointner |
| 2004/0093334 A1 | 5/2004 | Scherer |
| 2005/0027983 A1 | 2/2005 | Klawon |
| 2008/0028069 A1 | 1/2008 | Urbanek |
| 2008/0059633 A1 | 3/2008 | Hu |
| 2009/0248465 A1 | 10/2009 | Recce |
| 2011/0113072 A1 | 5/2011 | Lee |
| 2012/0036235 A1 | 2/2012 | Chan |
| 2012/0143917 A1 | 6/2012 | Prabaker |
| 2013/0024910 A1 | 1/2013 | Verma |
| 2013/0080911 A1 | 3/2013 | Klemm |
| 2013/0179988 A1 | 7/2013 | Bekker |
| 2014/0279641 A1 | 9/2014 | Singh |
| 2015/0074101 A1 | 3/2015 | Solheim |
| 2015/0135043 A1 | 5/2015 | Apps |
| 2016/0026717 A1 | 1/2016 | Kelsey |
| 2016/0239658 A1 | 8/2016 | Loughlin-McHugh |
| 2016/0277528 A1 | 9/2016 | Guilaume |
| 2017/0017383 A1 | 1/2017 | Upadhyaya |
| 2017/0140174 A1 | 5/2017 | Lacey |
| 2017/0316515 A1 | 11/2017 | Varma |
| 2018/0005239 A1 | 1/2018 | Schlesinger |
| 2018/0157662 A1 | 6/2018 | Chin |
| 2018/0165781 A1 | 6/2018 | Rodriguez |
| 2018/0181964 A1 | 6/2018 | Zagarese |
| 2019/0280862 A1 | 9/2019 | Crego |
| 2019/0342175 A1 | 11/2019 | Wan |
| 2020/0026834 A1 | 1/2020 | Vimadalal |
| 2020/0074111 A1 | 3/2020 | Mitchell |
| 2020/0177598 A1 | 6/2020 | Storr |
| 2020/0242232 A1 | 7/2020 | Machani |
| 2020/0366671 A1 | 11/2020 | Larson |
| 2021/0019763 A1 | 1/2021 | Helles |
| 2021/0075788 A1 | 3/2021 | Pasterk |
| 2021/0195260 A1 | 6/2021 | Major |
| 2021/0351927 A1 | 11/2021 | Gal |
| 2021/0374749 A1 | 12/2021 | Vukich |
| 2022/0035952 A1 | 2/2022 | Brannon |
| 2022/0076262 A1 | 3/2022 | Boyd |
| 2022/0122087 A1 | 4/2022 | Gosset |
| 2022/0139535 A1 | 5/2022 | Kushnir |
| 2022/0200937 A1 | 6/2022 | Bar-On |
| 2022/0240095 A1 | 7/2022 | Kovac |
| 2022/0300703 A1 | 9/2022 | Mcarthur |
| 2022/0337443 A1 | 10/2022 | Sood |
| 2022/0351284 A1 | 11/2022 | Cañón Paez |
| 2022/0368685 A1 | 11/2022 | Pollack |
| 2022/0414323 A1 | 12/2022 | Sreenivasan |
| 2023/0061746 A1 | 3/2023 | Wei |
| 2023/0080322 A1 | 3/2023 | Smith |
| 2023/0145179 A1 | 5/2023 | Chen |
| 2023/0199028 A1 | 6/2023 | Ho |
| 2023/0205833 A1 | 6/2023 | Rudra |

500

| 502 Shared With | Status | Shared On |
|---|---|---|
| ABC Bank Co. | Accepted | 17 Jan 2023 |
| XYZ Investments Inc. | Under Review | 22 Feb 2023 |

| 602 Document type | Entity type | Required |
|---|---|---|
| Passport | Individual | ☐ |
| Bank Statement | Any | ☑ |
| Business License | LLC | ☑ |

| Shared With | Status | Requested On |
|---|---|---|
| Tom C. | Accepted | 10 Jan 2023 |
| Alpha Corp. | Under Review | 14 Dec 2022 |

702 — 704 Shared With — 706 Status — 708 Requested On

Tom C.
09/04/1981
USA
San Diego, CA
858-555-5505

| Document Name | Status | Date |
|---|---|---|
| *Government ID* | Uploaded | 16 Jan 2023 |

804 — 806

Risk Rating:

Very Low — 812 — 814 — Very High

FIG. 8

SYSTEMS AND METHODS TO FACILITATE SYNCHRONIZED SHARING OF CENTRALIZED AUTHENTICATION INFORMATION TO FACILITATE ENTITY VERIFICATION AND RISK ASSESSMENT

FIELD OF THE DISCLOSURE

The present disclosure relates to systems and methods to facilitate synchronized sharing of centralized authentication information to facilitate entity verification and risk assessment.

BACKGROUND

Financial and other institutions are regulated by strict due diligence procedures. By way of non-limiting illustration, a due diligence procedure referred to as Know Your Customer ("KYC") is a process that financial companies use to verify customer identity and assess and monitor risk factors for fraud and other financial crimes. KYC ensures a customer is who they say they are. For business customers, institutions follow Know Your Business ("KYB") procedures which allow companies to adhere to regulatory obligations with respect to verifying the identity of business customers and monitoring their risk. In the United States and elsewhere, these procedures are required for any financial institution that deals with customers while opening and maintaining financial accounts. Compliance with regulations helps prevent money laundering, terrorism financing, fraud schemes, and other crimes. By verifying a customer's identity and intentions when the account is opened, financial and other institutions can more accurately pinpoint suspicious clients and their activities.

SUMMARY

One or more aspects of the present disclosure address problems associated with current technology used by platforms that facilitate verification and/or risk assessment of potential customers by organizations that must comply with due diligence procedures. For the sake of this disclosure, an organization subject to obligatory compliance with one or more regulations (government or other) may be referred to as a "compliance organization."

Web-based platforms existing today may facilitate identification verification based on potential customers supplying official identification documents (e.g., driver's license, passport, etc.) which are electronically analyzed for authenticity. If multiple compliance organizations are requesting verification of a common potential customer (e.g., an individual person or business entity), that potential customer has to compile and send documentation to each requesting compliance organization through separate transactions carried out within these platforms. A result is the platforms have to store, manage, and exchange multiple instances of user documentation, resulting in increased storage, bandwidth, and computer processing requirements. Not surprisingly, issues of documentation consistency and accuracy across the multiple different requests may also arise due to human error. Further, any updates to documentation or other user data would have to be manually provided by the potential customer for each request, and then manually recorded by each compliance organization-assuming the potential customers sends them the update in the first place. Additional problems arise if the compliance organizations each use different platforms altogether, meaning a potential customer is not only required to manually maintain accurate and consistent documentation across multiple different requests, but also multiple different platforms as well.

One aspect of the present disclosure relates to a system configured to facilitate synchronized sharing of centralized authentication information to facilitate entity verification and/or risk assessment. One or more implementations of the system may address one or more of the problems described herein, and may include benefits and advantages that will become apparent to a person of ordinary skill in the art. In particular, one or more implementations of the systems and methods described herein solve one or more problems of existing technological solutions by leveraging secure centralized database(s) as a single source of truth through with data is disseminated in a synchronized and automated manner. The system may form a platform (e.g., a customer due diligence platform) through which users are verified/screened and assessed for risk by organizations that abide by, or otherwise must comply with, jurisdictional regulations and/or organizational standards ("compliance organizations"). Users (e.g., individual persons and business entities) may create profiles within the platform by supplying personal information and/or documentation which may be verified for authenticity through one or more automated procedures. Organizations may submit requests for documentation and/or other information about users as part of performing risk assessments.

The system may be configured to provide the organizations with requested authenticated documentation by accessing a database and securely passing that information/documentation to client devices associated with the organizations for display and review. The system may maintain a highly encrypted database(s) of user profiles including the underly data and documentation. Any updates to user data may be stored and made current in the database(s). If user identification and/or other documents expire (and/or are deemed unacceptable), the system may be configured to automatically submit requests for updated documents from the users. Once uploaded, organizations who have been provided access to user data (information/documentation) as part of previous and/or ongoing requests may automatically receive access to the updated information/documentation for further display, review, and/or evaluation/reevaluation of risk. In this manner, changes and/or updates to user data are automatically synchronized with previous and/or ongoing requests made by one or more compliance organizations eliminating the need for manual processing by either party, as well as freeing up storage and computer processing requirements of the system.

If documentation for a user is not present, the system may send requests to users to supply any documentation and/or information not yet provided. The organizations may use the system to create customized and automated risk assessments in accordance with their specific jurisdictional or organizational rules and standards.

One or more implementations of a system to facilitate synchronized sharing of centralized authentication information to facilitate entity verification and risk assessment may include one or more of non-transitory electronic storage, one or more hardware processors configured by machine-readable instructions, and/or other components.

The non-transitory electronic storage may be configured to store one or more of profiles, and/or other information. The profiles may include one or more of user profiles, organization profiles, and/or other profiles. User profiles may be associated with users of the system who are being assessed for risk. Organization profiles may be associated with compliance organizations who are assessing users for risk because the compliance organizations abide by, or otherwise must comply with, jurisdictional regulations and/or organizational standards. In some implementations, a compliance organization may be a financial institution, such as a bank, while a user may be an individual or business entity who wishes to do business with the financial institution.

The individual user profiles may include one or more of user information describing individual users, one or more content items associated with individual users, one or more authenticated content items associated with individual users, and/or other information. By way of non-limiting illustration, the user profiles may include a first user profile for a first user and/or other user profiles. The first user profile may include one or more of first user information describing the first user, a first authenticated content item associated with the first user, and/or other information and/or content items. By way of non-limiting illustration, the first user information may include information input by the first user into a user interface (e.g., name, age, sex, address, etc.); and the first authenticated content item may include a scan or copy of an identification document (e.g., passport, driver's license, etc.).

The processor(s) may be configured to obtain requests to verify and/or assess risk of users. Individual ones of the request may be associated with individual ones of the compliance organizations. Individual ones of the requests may include information identifying individual ones of the user profiles, request criteria, and/or other information. The request criteria may indicate content item types and/or other information that may be required as part of assessment by compliance organizations. The compliance organizations may create customized request for automated risk assessments in accordance with their specific jurisdictional or organizational rules and standards. By way of non-limiting illustration, the requests may include a first request by a first compliance organization, and/or other requests. The first request may identify the first user profile and/or other user profiles. The first request may indicate that a first content item type is required as part of verification and assessment of users by the first compliance organization.

The processor(s) may be configured to generate user interface information defining a user interface through which content of the user profiles are accessed by compliance organizations. The user interface may be configured to display one or more of user information, instances of content items, and/or other information from the user profiles. In some implementations, the user interface may display, on computing platforms associated with compliance organizations, the content within the user profiles that satisfy the request criteria of the requests. Accordingly, in some implementations, only the documentation that satisfies the requirements of the requests may be pulled from the database and securely shared with the compliance organizations, while leaving the remaining content of the user profiles secure. By way of non-limiting illustration, the user interface information may define the user interface so that content from the first user profile satisfying the first request may be accessed. By way of non-limiting illustration, the content satisfying the first request may include one or more of the first user information, the first authenticated content item, and/or other content from the first user profile.

The processor(s) may be configured to effectuate communication of the user interface information to computing platforms associated with the compliance organizations. Reception of the user interface information at the computing platforms may cause the computing platforms to present the user interface displaying content of the user profiles that satisfies the request criteria of the requests. By way of non-limiting illustration, the user interface information may be communicated to a first computing platform associated with the first compliance organization to cause the first computing platform to present the user interface displaying one or more of the first user information, an instance of the first authenticated content item, and/or other content of the first user profile satisfying the first request.

The processor(s) may be configured to obtain updates to the user profiles. By way of non-limiting illustration, a first update to the first user profile may be obtained. The first update may include a first change to the first user information to generate updated first user information within the first user profile. The first update may include a second change to the first authenticated content item to generate an updated first authenticated content item.

The processor(s) may be configured to automatically update the user interface information based on the updates to the user profiles so that the instances of the content displayed in the user interface reflects the updates to the user profiles. By way of non-limiting illustration, responsive to the first update, the user interface information may be automatically updated to cause the user interface presented by the first computing platform and/or other computing platforms to display one or more of the updated first user information, an instance of the updated first authenticated content item, and/or other updated content from the first user profile. If one or more other compliance organizations (e.g., a second compliance organization, a third compliance organization, etc.) also requested information from the first user profile, the user interface presented at computing platforms of the other compliance organizations may be similarly and contemporaneously updated to reflect synchronous updates of information from the first user profile.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates a user interface comprising a request status page through which a user views status of request(s), in accordance with one or more implementations.

FIG. 6 illustrates a user interface comprising a request profile page through which a compliance organization specifies request criteria of a request, in accordance with one or more implementations.

FIG. 7 illustrates a user interface comprising a request status page through which a compliance organization views status of request(s), in accordance one or more implementations.

FIG. 8 illustrates a user interface comprising a risk assessment page showing results of automated risk assessment of a user and providing access to content of a user profile of the user that satisfies a request, in accordance with one or more implementations.

DETAILED DESCRIPTION

Figure 1:
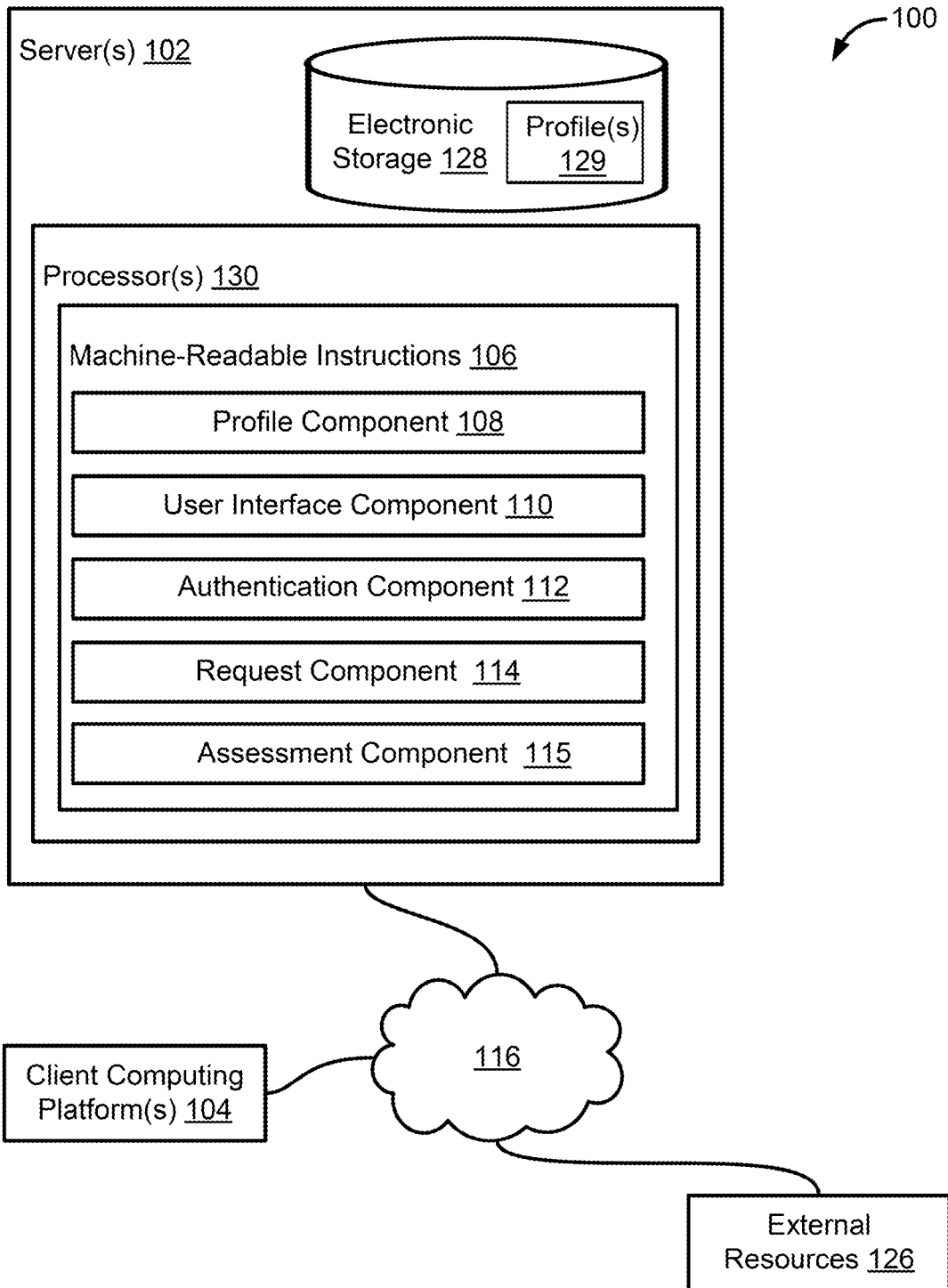
FIG. 1 illustrates a system configured to facilitate synchronized sharing of centralized authentication information to facilitate entity verification and risk assessment, in accordance with one or more implementations.

FIG. 1 illustrates a system 100 configured to facilitate synchronized sharing of centralized authentication information to facilitate entity verification and risk assessment, in accordance with one or more implementations. Users of the system 100 who are compliance organizations may submit requests for documentation and/or other information about other users of the system that are the subject of identity verification and/or risk assessment. The system 100 may be configured to provide the organizations with requested authenticated documentation by accessing a database and securely passing that information/documentation to the organizations for display and review at client devices. The system 100 may be configured to maintain a highly encrypted database of user profiles including underly user data and authenticated documentation. Any updates to user documentation may be stored and made current in a database through which synchronized updates to prior and/or ongoing requests may be derived. Once uploaded, organizations who share that information/documentation may automatically receive access to the updated document for further display, review, and/or risk assessment. If documentation for a user is not present, the system 100 may send requests to users to supply any documentation not yet provided. The organizations may use the system 100 to create customized and automated risk assessments in accordance with their specific jurisdictional and/or organizational rules and standards.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. It is noted that while both compliance organizations and entities subject to identity verification and/or risk assessment are both "users" of the system 100 (e.g., both may interact with the system 100 and/or each other, and/or impact aspects of the system 100), in some implementations the term "users" may be used refer to the entities subject to identity verification and/or risk assessment, while the compliance organizations may be referred to as "compliance organizations" or "organizations."

Server(s) 102 may include one or more of non-transitory electronic storage 128, one or more processors 130 configured by machine-readable instructions 106, and/or other components. The non-transitory electronic storage 128 may be configured to store one or more profiles 129. The profile (s) 129 may include one or more of user profiles, organization profiles, and/or other information. User profiles may be associated with users of the system who are being assessed for risk. Organization profiles may be associated with compliance organizations who are assessing users for risk because the compliance organizations abide by, or otherwise must comply with, jurisdictional regulations and/or organizational rules standards.

In some implementations, a compliance organization may be a financial institution and/or other institution or organization subject to jurisdictional regulation and/or organizational rules and standards (self-imposed or otherwise). By way of non-limiting illustration, a compliance organization may comprise a bank. A user may be an individual or business entity who wishes to do business with a compliance organization (e.g., employ the services of the compliance organization) and will thereafter be the subject of the compliance organization's compliance procedure. By way of non-limiting illustration, a user may be a potential customer. The user may comprise an individual person or a business entity. A business entity may comprise an organization formed to conduct business (e.g., sole proprietorships, partnerships, corporations, limited liability companies (LLCs), etc.). A business entity may itself be made up of individuals including, but not limited to, members, partners, shareholders, and/or other individuals. A business entity may create a user profile representing the business entity as a whole, while individuals making up a business entity may individually create user profiles.

Individual user profiles may include one or more of user information associated with and/or otherwise describing individual users (sometimes referred to as "user verification information"), one or more authenticated content items associated with individual users, and/or other information.

The user information may define values of user attributes and/or other information. The values of the user attributes may describe characteristics of the users and/or authentication requests associated with the users. The user attributes describing characteristics of the users may include one or more of a name attribute, a demographics attribute, a location attribute, a contact attribute, and/or other attributes. The user attributes describing authentication requests associated with the users may include one or more of a requestor attribute, a document attribute, a status attribute, a timing attribute, and/or other attributes.

A value of a name attribute may define a name characteristic of a user. A name characteristic of an individual may include one or more of a legal name, a preferred name, a nickname, alias(es), and/or other information. A name characteristic of a business entity may include one or more of full business name, a stock listing name/symbol, and/or other information.

A value of a demographics attribute may define demographic characteristics of a user. A demographic characteristic of an individual may include one or more of age, sex, occupation, cultural background, family status, and/or other information. A demographics characteristic of a business entity may include one or more of entity type (e.g., sole proprietorship, LLC, etc.) and/or other information.

A value of a location attribute may define a location characteristic of a user. A location characteristic of an individual may include one or more addresses, legal jurisdictions, and/or other information. By way of non-limiting illustration, addresses may include one or more of a home address, a work address, a zip code, a city, a state, and/or other information. A legal jurisdiction may include an identification of a country, state, and/or region having jurisdiction over the individual. A location characteristic of a business entity may include one or more address(es), legal jurisdiction, and/or other information. By way of non-limiting illustration, addresses may include one or more of address of principle place of business, address of one or more hubs or centers, address of corporate officer(s), and/or other information. A legal jurisdiction may include an identification of a country, state, and/or region having jurisdiction over the business entity.

A value of a contact attribute may define a contact information for a user. Contact information may include one or more of a name of a business agent (for business entities), a telephone number, an email, a social media handle, and/or other information.

The user attributes describing authentication requests associated with the users may include one or more of a requestor attribute, a document attribute, a status attribute, a timing attribute, and/or other attributes.

A value of a requestor attribute may include information identifying individual compliance organizations who have submitted request(s) associated with individual users. Compliance organizations may be identified by name, username, and/or other identifying information.

A value of a document attribute may include information identifying and/or describing content items provided by a user, content items that have been authenticated, and/or other content. Individual content items may be identified by one or more document name, content item type, unique IDs, and/or other information. Authenticated content items associated with individual users may refer to documents and/or other content that a user has provided in order to verify their identify and/or otherwise comply with one or more requirements of a risk assessment by a compliance organization. By way of non-limiting illustration, content items may include document such documents proving residence, ownership of assets, employment, and/or other documents. Users may supply (e.g., upload, scan, etc.) content items for storage. The content items may thereafter be authenticated for accuracy and completeness so that they may become classified as authenticated content items. Authentication may be performed by the system 100 and/or sent to a third-party authentication system (see, e.g., authentication component 112).

A value of a status attribute may describe status of individual requests and/or status of individual authenticated content items. Status of individual requests may characterize current state of the individual requests. State of individual requests may be characterized by one or more of timing information (e.g., when request was received, when information from a user profile was accessed, when a requested ends, and/or other information), completion information (e.g., is the request pending, canceled, expired, incomplete, partially complete, or complete), and/or other information. Status of individual authenticated content items may characterize current state of the individual authenticated content items. State of individual authenticated content items may be characterized by one or more of timing information (e.g., when a content item was uploaded, when a content item was accessed by a user or compliance organization, when a content item was updated or changed, when a content item will expire, when a content item was removed, and/or other information), review status (e.g., was the content item reviewed, is the content item under review, is the content item slated to be removed, was a request to update or change the content item made, and/or other information), and/or other information. In some implementations, expiration may be defined with respect to stated expirations on the documents themselves, and/or based on a specified passage of time. By way of non-limiting illustration, a driver's license may expire on an expiration date specified on the license; while a document proving a home address (e.g., utilities invoice) may expire after a specified period of time (e.g., the document is considered appropriate for address verification for up to one year).

By way of non-limiting illustration, the user profiles may include a first user profile for a first user and/or other user profiles. The first user profile may include one or more of first user information describing the first user, a first authenticated content item associated with the first user, and/or other information and/or content items. By way of non-limiting illustration, the first user information may include information input by the first user into a user interface (e.g., name, age, sex, address, etc.); and the first authenticated content item may include a scan or copy of an identification document (e.g., passport, driver's license, etc.) and/or other documentation (e.g., proof of ownership of one or more assets).

The individual compliance organization profiles may include one or more of organization information describing individual compliance organizations, request information, request profiles, risk profiles and/or other information.

The organization information describing individual compliance organizations may define values of organization attributes and/or other information. The organization attributes describing characteristics of the compliance organizations may include one or more of a name attribute, a location attribute, a contact attribute, and/or other attributes. The one or more of the name attribute, location attribute, contact attribute, and/or other attributes making up the organization attributes may characterize the same or similar information as they do for users who are business entities.

The request information may include values of the request attributes describing characteristics of requests submitted by the compliance organizations. The request attributes describing characteristics requests may include one or more of a subject attribute, a status attribute, a timing attribute, and/or other attributes.

A value of a subject attribute may include information identifying users who are subjects of requests submitted by compliance organizations. Users may be identified by name, username, full business name (for business entities), and/or other identifying information.

A value of a status attribute associated with compliance organizations may describe status of individual requests submitted by the compliance organizations and/or status of individual authenticated content items associated with the individual requests. Status of individual requests may characterize current state of the individual requests from the perspective of the compliance organizations. State of individual requests may be characterized by one or more of timing information (e.g., when a request was generated, when a request was submitted, when and what information from a user profile was retrieved as part of a request, when a request ends or expires, and/or other information), completion information (e.g., is the request pending, canceled, expired, incomplete, partially complete, under review, and/or complete), and/or other information. Status of individual authenticated content items may characterize current state of the individual authenticated content items requested as part of a request. State of individual authenticated content items may be characterized by one or more of timing information (e.g., when a content item was uploaded by a user, when a content item was accessed by a user or compliance organization, when a content item was updated or changed, when a content item will expire, when a content item was removed, and/or other information), review status (e.g., was the content item reviewed, is the content item under review, is the content item slated to be reviewed, was a request to update or change the content item made, and/or other information), authentication status (e.g., is the content item indicated as authenticated, is the content item under review for authentication), and/or other information.

An individual request profile may include an individual set of request criteria. Individual compliance organizations may be associated with multiple request profiles that each include a customized set of request criteria. Compliance organizations may associate a given request profile with a given type of potential customer, such that they may select and deploy a given request profile on an as-needed basis without having to redefine the request criteria for subsequent requests. The request criteria may indicate a set of criterion that specify content item types and/or other information that may be required as part of assessment by compliance organizations. Content item types may be characterized by document type, document name, and/or other information. Document types may include address verification type, employment verification type, asset ownership type, entity verification type, and/or other types.

Address verification type documents may include documents that show or prove stated residence or address of users. By way of non-limiting illustration, address verification type documents may include one or more of lease agreements, utility bills, and/or other documents.

Employment verification type documents may include documents that show or prove stated employment status and/or income of users. By way of non-limiting illustration, employment verification type documents may include one or more of tax returns, W-2 forms, 1090 forms, and/or other documents.

Asset ownership type documents may include documents that show or prove stated asset ownerships of users. By way of non-limiting illustration, asset ownership type documents may include one or more of deeds, trusts, wills, pink slips, purchase agreements, and/or other documents.

Entity verification type documents may include documents that show or prove stated asset business formations of users who are business entities. By way of non-limiting illustration, entity verification type documents may include one or more of certificates of formation, IRS form K-1, and/or other business records.

In some implementations, content item types may be characterized by specific document names (e.g., a specific deed, IRS form, and/or other specified document).

An individual risk profile may include an individual set of risk assessment criteria. Individual compliance organizations may be associated with multiple risk profiles that each include a customized set of risk assessment criteria. Compliance organizations may select and deploy a given risk profile on an as-needed basis without having to redefine the risk assessment criteria for subsequent risk assessments. Risk assessment criteria may include one or more of risk values that are assigned to particular information and/or weighting information describing weights that are applied to each risk value. In performing risk assessment (see, e.g., assessment component 115), information collected from user profiles may be assigned values, weighted, and aggregated to produce aggregate risk values.

It noted that the above descriptions of user profiles and compliance organization profiles are for illustrative purposes only and are not to be considered limiting. Instead, it is to be understood that the profiles may include other information and/or may define users and compliance organizations in other ways. For example, a compliance organization has the ability to custom-define risk assessment criteria, and compile sets of criteria into risk profiles through the system 100, which may allow the compliance organization to assess risk in any way they deem fit as needed to comply with the particular regulations they may be subject to. Thus, while one or more descriptions herein may provide discrete examples of risk assessment criteria and the content item types that may fit into this criteria, this is for illustrative purposes only and not to be considered limiting. Instead, those skilled in the art may appreciate that this criteria may include other criteria depending on the particular needs of a compliance organization, their industry, and the ever changing landscape of government regulations.

In FIG. 1, machine-readable instructions 106 of one or more processors 130 of server(s) 102 may include one or more instruction components. The instruction components may include computer program components. Executing the machine-readable instructions 106 may cause server(s) 102 to facilitate synchronized sharing of centralized authentication information to facilitate entity verification and/or risk assessment. The instruction components may include one or more of a profile component 108, a user interface component 110, an authentication component 112, a request component 114, an assessment component 115, and/or other instruction components.

The profile component 108 may be configured to obtain, manage, and/or access user profiles and/or compliance organization profiles stored by electronic storage 128. Managing profiles may include one or more of generating profiles, changing profiles, updating existing information within profiles, and/or other features and/or functionality.

The electronic storage 128 may include a secure database that stores and encrypts content making up profiles. As information is provided to system 100, it may be encrypted and stored in association with public and private keys. Private keys may be stored in user profiles and made available to users of the user profiles when accessing user profiles (e.g., after a user logs in). Thus, the system 100 itself may not have access to the substantive content of the user profiles, other than the encrypted version of the data. Generating and presenting user interfaces to display content of user profiles and/or other information stored in electronic storage 128 may be based on being granted access to the database. Relationships between user profiles and organization profiles may be established and authorized. For example, a request submitted by compliance organization with respect to a user may have to be accepted and/or otherwise indicated as authorized by the user before information is shared from a user profile. The private keys held in user profiles may then be passed to organization profiles so that content of user profiles satisfying requests can be accessed and displayed at computing platforms of the compliance organizations.

User interface component 110 may be configured to effectuate presentation of individual user interfaces on individual client computing platforms of one or more client computing platforms 104. User interface component 110 may be configured to establish one or more network connections between the server(s) 102 and individual client computing platforms. User interface component 110 may be configured to effectuate communication of user interface information to the individual client computing platforms over the one or more network connections to cause the individual client computing platforms to present one or more user interfaces.

User interface component 110 may be configured to generate user interface information defining one or more user interfaces through which users and/or compliance organizations interact with the system 100 and/or each other. A given user interface may be configured to facilitate one or more of defining and/or updating profiles, submitting and/or displaying requests, and/or other features and/or functionality described herein. An instance of a user interface may include one or more user interface portions. By way of non-limiting illustration, a user interface may include one or more of an input portion, a display portion, and/or other portions. Individual portions may include one or more user interface elements configured to facilitate user interaction with the user interface. By way of non-limiting illustration, user interface elements may include one or more of text input fields, drop down menus, check boxes, display windows, virtual buttons, file drag-and-drop elements, file upload buttons, and/or other elements configured to facilitate user interaction.

An input portion of a user interface may be configured to obtain user input. User input may include one or more of input to generate a profile, input to modify a profile, input to update a profile, input to navigate between pages, and/or other input. The user input may include one or more of entering text, selecting user interface elements, uploading digital content items (e.g., electronic files), and/or other user input. A display portion may be configured to display information.

In some implementations, users may be provided a user interface through which the users manage the user profiles. Managing may include one or more of creating, editing (e.g., adding information and/or documents, modifying information and/or documents), and/or other actions that may impact the content of user profiles. By way of non-limiting illustration, the user interface may be configured to receive user entry and/or selection of user information, uploads of instances of content items to be authenticated, uploads of authenticated content items, and/or other user input. By way of non-limiting illustration, user interface component 110 may be configured to generate user interface information that defines a user interface through which the first user manages content of the first user profile.

User interface component 110 may be configured to effectuate communication of user interface information to computing platforms associated with the users to cause the computing platforms associated with the users to present the user interface through which the users manage the user profiles. By way of non-limiting illustration, user interface component 110 may be configured to effectuate communication of user interface information to the computing platform associated with the first user to cause the computing platform to present the user interface so that the user may manage the first user profile.

In some implementations, a user interface through which users manage the user profiles may include one or more user interface pages (sometimes referred to simply as "pages"). Pages may be expressed as individual portions of a user interface, windows of a user interface, and/or other user interfaces altogether. Users may navigate between pages through one or more of a navigation button, selection of tabs, and/or other user input. The user interface information may further define individual pages of the user interface. An individual page may be dedicated to, and/or otherwise associated with, presenting particular sets of information. By way of non-limiting illustration, pages may include one or more of profile pages through which the users access the user profiles, request status pages displaying status of the requests, document status pages displaying status of individual authenticated content items, and/or other pages.

Figures 3, 4:
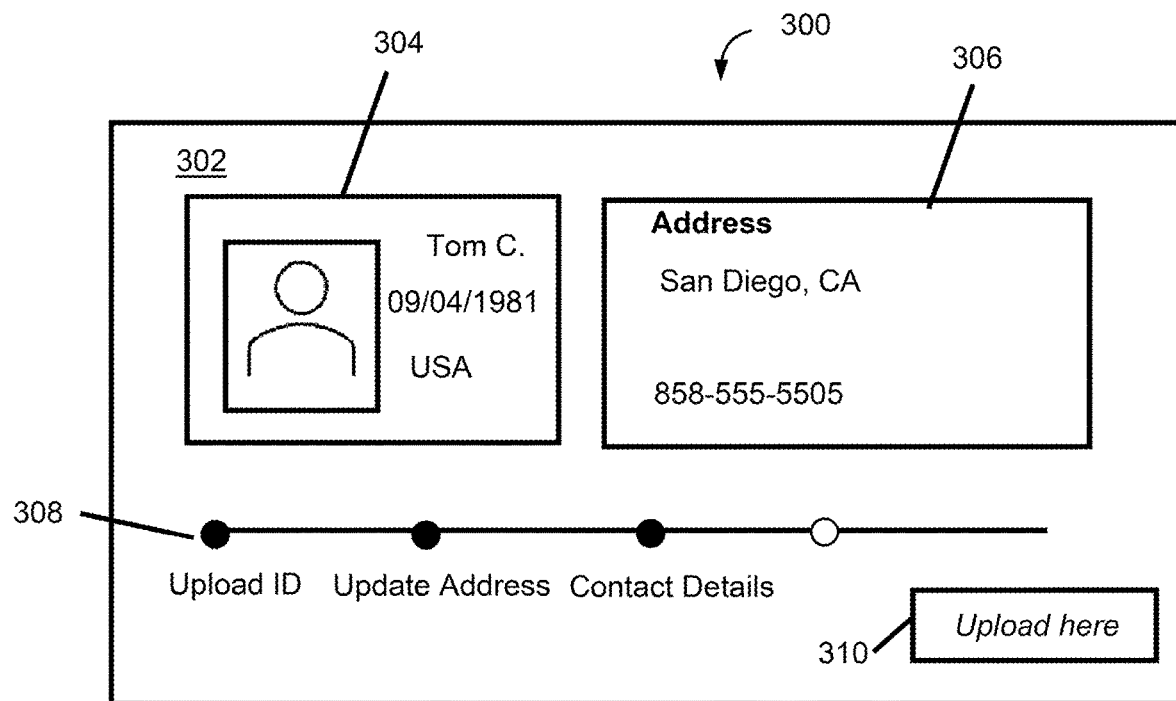
FIG. 3 illustrates a user interface comprising a profile page through which a user manages a user profile, in accordance with one or more implementations.
FIG. 4 illustrates a user interface comprising a document status page through which a user views status of content item(s) shared as part of request(s), in accordance with one or more implementations.

Profile pages may provide users with access to view, edit, update, and/or otherwise interact with content of their user profiles (see, e.g., FIG. 3).

Request status pages may display status of one or more requests from the perspective of users (see, e.g., FIG. 5). In some implementations, an individual request status page may display status of an individual request. In some implementations, an individual request status page may display status of one or more requests. By way of non-limiting illustration, a request status page may display one or more values of a status attribute describing status of individual requests.

The document status pages may display status of one or more content items and/or authenticated content items (see, e.g., FIG. 4). In some implementations, an individual document status page may display status of a content item as being authenticated, under review for authentication, and/or denied authentication. In some implementations, an individual document status page may display status of an individual authenticated content item. In some implementations, an individual documentation status page may display status of one or more authenticated content items. In some implementations, an individual documentation status page may display status of one or more authenticated content items associated with one or more requests. By way of non-limiting illustration, a document status page may display one or more values of a status attribute describing status of individual authenticated content items.

In some implementations, an individual page may include grid, and/or other display arrangements. A grid may include one or more of a set of attribute-named columns, a set of rows, individual cells at intersections of individual attribute-named columns and individual rows, and/or other content. An individual attribute-named column may represent an individual attribute. An individual row may represent an individual content item or request. The individual cells may include individual values of the individual attributes represented in the attribute-named columns.

In some implementation, compliance organizations may be provided a user interface may be configured to obtain user entry and/or selection of requests by compliance organizations to verify and assess risk of one or more users. The entry and/or selection of a request may include one or more of entry and/or selection of a user or user profile, request criteria, and/or other information. Individual ones of the requests may identify individual ones of the user profiles and may include request criteria and/or other information.

In some implementations, a user interface provided to compliance organizations may be configured to receive entry and/or selection of request criteria through a set of user interface elements of the user interface. The set of user interface element may correspond to potential content item types that are available to be included in the requests. The entry and/or selection of a user interface element in the set of user interface element may cause a corresponding potential content item type to be included as a content item type required by a request. In some implementations, one or more user interface elements may allow compliance organizations to custom-define request criteria including, but not limited to, custom-defined content item types.

In some implementations, upon entry and/or selection of request criteria, the compliance organizations may be provided an option to save the request criteria into a request profile. In some implementations, entry and/or selection of request criteria may be accomplished through selection of a previously defined request profile.

In some implementations, a user interface provided to compliance organizations may be configured to receive entry and/or selection to submit a request. By way of non-limiting illustration, the user interface may include a virtual button labeled "submit" that causes a request to be executed.

It is noted that while submission of requests is described with respect to entry and/or selection within a user interface of the system 100, this is for illustrative purpose only and not to be considered limiting. Instead, in some implementations, requests may be generated and/or submitted through input into an external resource 126. Compliance organizations and/or users may link external accounts, such as email, social media, message applications, and/or other external accounts. External accounts may be part of external resource (s) 126 in FIG. 1. One or more external accounts may be communicate with the server(s) 102. User input into an external account may cause a request to be generated and/or submitted by the system 100. By way of non-limiting illustration, a compliance organization may link an externa email account where sending of emails to certain recipients and/or including certain key words may provide the basis for submitting requests.

In some implementation, compliance organizations may be provided a user interface may be configured to obtain user entry and/or selection of risk assessment criteria of risk profiles. A user interface provided to compliance organizations may be configured to receive entry and/or selection of risk assessment criteria through a set of user interface elements of the user interface. The set of user interface element may be configured to receive user input to perform one or more of identify user information and/or content item types, assign risk values the user information and/or content item types, assign weights to the risk values, and/or specify other information making up risk profiles. In some implementations, risk values may include numerical values that make up a sliding scale of risk (e.g., a value being an integer between zero and five, with zero being very low risk of criminally activity and five being high risk). Weights may be defined by decimal values between zero and one, with zero being no weight is given and one being full weight is given.

The user interface component 110 may be configured to generate user interface information defining a user interface through which content of user profiles are provided to compliance organizations in response to submission of request. The user interface may be configured to display one or more of user information, instances of authenticated content items, and/or other information in the user profiles. In some implementations, the user interface through which content of the user profiles are accessed by compliance organizations may be limited to content within the user profiles that satisfy the request criteria of the requests submitted by the compliance organizations. Accordingly, the compliance organizations may be limited to only viewing and/or accessing a record of the documentation and/or information they requested, while other information in the user profiles not requests is maintained securely in storage. By way of non-limiting illustration, the user interface information may define a user interface through which the first user information, the first authenticated content item, and/or other information of the first user profile is accessed by one or more compliance organizations.

The user interface component 110 may be configured to provide functionality of automated translation of documents to a specified language. By way of non-limiting illustration, the system 100 may include and/or may have access to machine translation functionality that may be performed on user-provided information and/or characters that are recognized from uploaded documents (e.g., performing OCR and machine translation). In some implementations, a machine translation service may be provided through an external resource.

In some implementations, a user interface through which content of the user profiles are accessed by compliance organizations may include one or more pages. The user interface information may further define individual pages of the user interface. An individual page may be dedicated to, and/or otherwise associated with, presenting particular sets of information regarding a request. By way of non-limiting illustration, pages may include one or more of a request profile page, a request status page, a risk assessment page, and/or other pages.

Request profile pages may provide compliance organizations with access to view, edit, create, update, and/or otherwise interact with request profiles (see, e.g., FIG. 6). The request profile pages may be configured to receive entry and/or selection of request criteria through a set of user interface elements of the user interface. Individual user interface elements may correspond to potential content item type to be included as a content item type required by a request. Potential content item types may be categorized by entity type. User interface elements (e.g., check boxes) may be selected to specify content item type that may be required as part of requests.

Request status pages of a user interface provided to compliance organizations may display status of one or more requests from the perspective of the compliance organizations (see, e.g., FIG. 7). In some implementations, an individual request status page may display status of an individual request. In some implementations, an individual request status page may display status of one or more requests. By way of non-limiting illustration, a request status page may display one or more values of a status attribute of an organization profile describing status of individual requests. By way of non-limiting illustration, a request status page may indicate if a request is one or more of active, expired, pending, and/or other has other statuses.

Risk assessment pages may comprise pages where compliance organizations define risk assessment criteria (and/or define risk profiles) and/or view the results of automated risk assessments of users based on the risk assessment criteria and content of the user profiles that satisfy the requests (see, e.g., FIG. 8). By way of non-limiting illustration, a risk assessment page may include a risk indicator which displays an aggregated risk value (see, e.g., assessment component 115). By way of non-limiting illustration, a risk indicator may comprise a visual display of a sliding scale with one end being very low risk and the other end being very high risk, and a slider positioned in the scale to represent a determined aggregate risk value.

The authentication component 112 may be configured to authenticate content items provided by users. Authentication by authentication component 112 may include processing of content items such as one or more of Optical Character Recognition (OCR), comparing content items against reference content items (e.g., comparing a drivers license photo to an image of a user uploaded by the user, comparing address listed on drivers license to address listed on utility bill, etc.), digital data forensics (e.g., document tamper detection, falsification detection, identifying official insignia or indicia, identifying signatures, etc.), and/or other processors. Those skilled in the art may recognize that document authentication is a technology in and of itself that may be included as part of the system 100 and/or provided through one or more external resources 126. Thus, while not described at length herein, those skilled in the art may appreciate the technical steps and/or procedures that may be required to authenticate user-provided documentation in accordance with one or more features and/or functionality presented herein.

The request component 114 may be configured to obtain and/or generate individual requests based on user input by the compliance organizations into one or more user interfaces. The request component 114 may be configured to obtain and/or generate individual requests based on user input by the compliance organizations into one or more external resources 126. By way of non-limiting illustration, the requests may include one or more of a first request by a first compliance organization, a second request by a second compliance organization, and/or other request. The first request may identify the first user profile and specify a first criterion. The first criterion may specify that content of a first content item type is required as part of verification and assessment by the first compliance organization. The second request may identify the first user profile and specify the first content item type as a second criterion is required as part of verification and assessment of the first user by the second compliance organization.

The request component 114 may be configured to, in response to obtaining individual requests, identify the user profiles associated with the requests, and/or perform other operations. The request component 114 may be configured to, in response to identifying the user profiles, identify content within the user profiles that satisfies the request criteria of the individual ones of the requests, and/or perform other operations. The request component 114 may be configured to, in response to obtaining individual requests, identify the user profiles associated with the requests and identify content within the user profiles that satisfies the request criteria of the individual ones of the requests. In some implementations, satisfaction of requests may be determined based on content of the user profiles being of the content item type(s) specified in the request criteria. In some implementations, request component 114 may be configured to generate and deliver onboarding invites to computing platforms of consumer who have yet to create user profiles within system. The invites may be sent via external messaging, such as email, which may include instructions on creating a user profile within the system 100.

By way of non-limiting illustration, the first user profile may be identified from the first request and the second request. The request component 114 may be configured to determine if content of the first user profile satisfies the first criterion. By way of non-limiting illustration, responsive to the first authenticated content item being of the first content item type, the first authenticated content item may be identified as satisfying the first request. Responsive to the first authenticated content item not being of the first content item type, the first request may be determined to be unsatisfied, unfulfilled, and/or still pending.

In some implementations, request component 114 may be configured to generate and deliver user requests to computing platforms associated with the users in response to the request criteria of the individual ones of the requests not being satisfied by the content within the user profiles. The user requests may comprise notifications or alerts communicated to computing platforms of the users for presentation within a user interface of the system and/or an external resource (e.g., email). The user requests may notify the users of the content item types that are missing from the user profiles but are required as part of the requests and/or may include other information.

By way of non-limiting illustration, responsive to the content of the first user profile not satisfying the first request (e.g., the first authenticated content item nor any other content item in the first user profile is of the first content item type), request component 114 may be configured to generate and deliver a first user request to a computing platform associated with the first user. The first user request may indicate that authenticated content items of the first content item type are missing from the first user profile but are required as part of the first request.

The user interface component 110 may be configured to, in response to content of the first user profile satisfying the first criterion of the first request, effectuate communication of the user interface information to a first computing platform associated with the first compliance organization to cause the first computing platform to present the user interface displaying one or more of the first user information, an instance of the first authenticated content item, and/or other information from the first user profile satisfying the first request.

The user interface component 110 may be configured to, in response to content of the first user profile satisfying the second criterion of the second request, effectuate communication of the user interface information to a second computing platform associated with the second compliance organization to cause the second computing platform to present the user interface displaying one or more of the first user information, an instance of the first authenticated content item, and/or other information from the first user profile satisfying the second request.

The profile component 108 may be configured to obtain updates to the user profiles. Updates may be provided and/or generated through user input by the users through a user interface used to manage the user profiles. By way of non-limiting illustration, a first update to the first user profile may be obtained. The first update may include one or more of a first change to the first user information to generate updated first user information within the first user profile, and/or other changes. The first update may include a second change to the first authenticated content item to generate an updated first authenticated content item, and/or other changes. By way of non-limiting illustration, the first change may include a change to the first user's last name (e.g., due to recent marriage). By way of non-limiting illustration, the second change may include supplying (e.g., uploading) a higher resolution version of the first authenticated content item.

The user interface component 110 may be configured to automatically update the user interface information defining one or more user interfaces based on updates to the user profiles and/or other information. The updated user interface information may cause the instances of the content displayed in, and/or otherwise accessed through, a user interface provided to compliance organizations to reflect the updates to the user profiles associated with their requests. Such updates may be carried out synchronously so that all requesting compliance organizations are automatically kept up to date without having to manually request and/or retrieve this information.

By way of non-limiting illustration, responsive to the first update, the user interface information communicated to the first computing platform may be automatically updated to cause the user interface presented by the first computing platform of the first compliance organization and/or other computing platforms to display one or more of the updated first user information, an instance of the updated first authenticated content item, and/or other updated content from the first user profile. If one or more other compliance organizations (e.g., a second compliance organization, a third compliance organization, etc.) also requested information from the first user profile, the user interface presented at computing platforms of the other compliance organizations may be similarly and contemporaneously updated to reflect synchronous updates of information from the first user profile. By way of non-limiting illustration, responsive to the first update, the user interface information communicated to the second computing platform may be automatically updated to cause the user interface presented by the second computing platform and/or other computing platforms to display one or more of the updated first user information, an instance of the updated first authenticated content item, and/or other updated content from the first user profile.

The request component 114 may be configured to manage requests by monitoring and/or determining status and/or status changes of the requests and/or authenticated content items. The status of the requests may be made current in user and compliance organization profiles. The request component 114 may be configured to determine expired status by querying dates, e.g., stated expiration dates, determining amount of time that has surpasses since an initial date (e.g., date of request, date of upload, and/or other dates). By way of non-limiting illustration, request component 114 may be configured to determine a status of a document is an expired states by querying any stated expiration on a document itself. By way of non-limiting illustration, request component 114 may be configured to determine a status of request is expired by determining a specified amount of time has passed without a user providing requisite information.

The user interface component 108 may be configured to generate and/or deliver user requests to computing platforms associated with the users. The user interface component 108 may be configured to generate and/or deliver user requests responsive to the status of the requests being an expired status. The user requests may indicate that additional and/or updated content is required to be uploaded to their user profiles in order to satisfy pending request(s) and/or requests that are resubmitted after expiration.

The assessment component 115 may be configured to perform automated risk assessments. In some implementations, the automated risk assessments may be based on risk assessment criteria defined by compliance organizations, such as risk assessment criteria making up one or more risk profiles created by the compliance organizations. The risk assessment criteria may be compared against the content of the user profiles that satisfy the request criteria. Risk values may be assigned to certain user information and/or content item types, applied to the content of the user profiles that satisfy requests, weighted based on custom-defined weights, and aggregated to provide aggregate risk values. The aggregate risk values may convey overall risk of doing business with a given user. Aggregating may include one or more of summing the weighted risk values, averaging the weighted risk values, and/or other operations. The risk values may include numerical values that make up a sliding scale of risk (e.g., a value being an integer between zero and five, with zero being very low risk of criminally activity and five being very high risk). Weights may be defined by decimal values between zero and one, with zero being no weight is given and one being full weight is given. The outcome of aggregating a set of risk values may be the aggregate risk value which itself may include a numerical value within a range of values making up sliding scale of overall risk. With this final value, a risk indicator may be generated as a visual display of the aggregated risk value shown in relation to the sliding scale. By way of non-limiting illustration, a visual display may include a horizontal bar representing a sliding scale, with one end being very low risk and the other end being very high risk, and a slider element positioned in the scale to represent an aggregate risk value. In some implementations the sliding scale may be color-coded to provide a more user-friendly visual of the level of risk. By way of non-limiting illustration, a zero risk side of the scale may be shaded green, the high risk side of the scale may be shaded red, and a middle of the scale being shaded yellow.

It is noted that the description of a sliding scale as a visual representation of a risk indicator is for illustrative purposes only and not to be considered limiting. Instead, those skilled in the art may appreciate other ways to visually represent the outcome of a risk assessment. By way of non-limiting illustration, a visual representation may include qualitative description of risk, e.g., a display of the words "high risk," "low risk," "moderate risk," "acceptable risk," and/or other descriptions may be provided.

FIG. 3 illustrates a user interface 300 comprising a profile page 302 through which a user manages a user profile, in accordance with one or more implementations. The user interface 300 may be configured to obtain user entry and/or selection of user information and/or content items. The user interface 300 may include a set of user interface elements. Individual user interface elements may correspond to individual user information and/or content items. Individual user interface elements may include, for example, display and/or text-entry fields. By way of non-limiting illustration, a first element 304 may display identifying information input by a user and/or content of an identification document (e.g., driver's license). A second element 306 may display identifying information input by a user and/or content of an identification document (e.g., driver's license). A third element 310 may be configured to receive user input to provide (e.g., upload) one or more content items (e.g., via drag-and-drop input of electronic files). In some implementations, the profile page 302 may include a status bar 308 displaying status of user input to generate their user profile.

FIG. 4 illustrates a user interface 400 comprising a document status page 402 through which a user views status of content item(s) shared as part of request(s), in accordance with one or more implementations. The user interface 400 may include a grid comprising a set of attribute-named columns, a set of rows, individual cells at intersections of individual attribute-named columns and individual rows, and/or other content. An individual attribute-named column may represent an individual attribute. By way of non-limiting illustration, the attributes may include a document name or type attribute 404, a status attribute 406, a date attribute 408 (e.g., timing information), and/or other attributes. An individual row may represent an individual content item or request. The individual cells may include individual values of the individual attributes represented in the attribute-named columns.

FIG. 5 illustrates a user interface 500 comprising a request status page 502 through which a user views status of request(s), in accordance with one or more implementations. The user interface 500 may include a grid comprising a set of attribute-named columns, a set of rows, individual cells at intersections of individual attribute-named columns and individual rows, and/or other content. An individual attribute-named column may represent an individual attribute. By way of non-limiting illustration, the attributes may include a requestor attribute 505, a status attribute 506, a date attribute 508 (e.g., timing information), and/or other attributes. An individual row may represent an individual content item or request. The individual cells may include individual values of the individual attributes represented in the attribute-named columns.

FIG. 6 illustrates a user interface 600 comprising a request profile page 602 through which a compliance organization specifies request criteria of a request, in accordance with one or more implementations. The user interface 600 may include a grid comprising a set of attribute-named columns, a set of rows, individual cells at intersections of individual attribute-named columns and individual rows, and/or other content. An individual attribute-named column may represent an individual attribute. An individual row may represent an individual content item or request. By way of non-limiting illustration, the attributes may include a document name or type attribute 604, a demographics attribute 606 (e.g., entity type), a column to specify whether the document type is to be included as part of request criteria of a request (e.g., check boxes), and/or other attributes. The individual cells may include individual values of the individual attributes represented in the attribute-named columns.

FIG. 7 illustrates a user interface 700 comprising a request status page 702 through which a compliance organization views status of request(s), in accordance one or more implementations. The user interface 700 may include a grid comprising a set of attribute-named columns, a set of rows, individual cells at intersections of individual attribute-named columns and individual rows, and/or other content. An individual attribute-named column may represent an individual attribute. By way of non-limiting illustration, the attributes may include a subject attribute 704, a status attribute 706, a date attribute 708 (e.g., timing information), and/or other attributes. An individual row may represent an individual content item or request. The individual cells may include individual values of the individual attributes represented in the attribute-named columns.

FIG. 8 illustrates a user interface 800 comprising a risk assessment page 802 showing results of automated risk assessment of a user and providing access to content of a user profile of the user that satisfies a request, in accordance with one or more implementations. By way of non-limiting illustration, a first element 804 may display identifying information input by a user and/or content of an identification document (e.g., driver's license) that is part of the user profile. A second element 806 may display authenticated content items that satisfy criteria of a request and/or document status of the authenticated content items. Compliance organization may access the authenticated content items by, for example, clicking on a document name which may cause a corresponding authenticated content item to be presented in a window and/or downloaded. The risk assessment page 802 may include a risk indicator which displays an aggregated risk value. By way of non-limiting illustration, the risk indicator may comprise a visual display of a sliding scale 814 with one end being very low risk and the other end being very high risk, and a slider 812 positioned in the scale 814 to represent a determined aggregate risk value.

Returning to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100. By way of non-limiting illustration, an external entity may include a document authenticator, and/or other entities.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s)

102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 115, and/or other components. Processor(s) 130 may be configured to execute components 108, 110, 112, 114, 115, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 115 are illustrated in FIG. 1 as being implemented within a single processing unit, in implementations in which processor(s) 130 includes multiple processing units, one or more of components 108, 110, 112, 114, and/or 115 may be implemented remotely from the other components. The description of the functionality provided by the different components 108, 110, 112, 114, and/or 115 described below is for illustrative purposes, and is not intended to be limiting, as any of components 108, 110, 112, 114, and/or 115 may provide more or less functionality than is described. For example, one or more of components 108, 110, 112, 114, and/or 115 may be eliminated, and some or all of its functionality may be provided by other ones of components 108, 110, 112, 114, and/or 115. As another example, processor(s) 130 may be configured to execute one or more additional components that may perform some or all of the functionality attributed below to one of components 108, 110, 112, 114, and/or 115.

Figure 2:
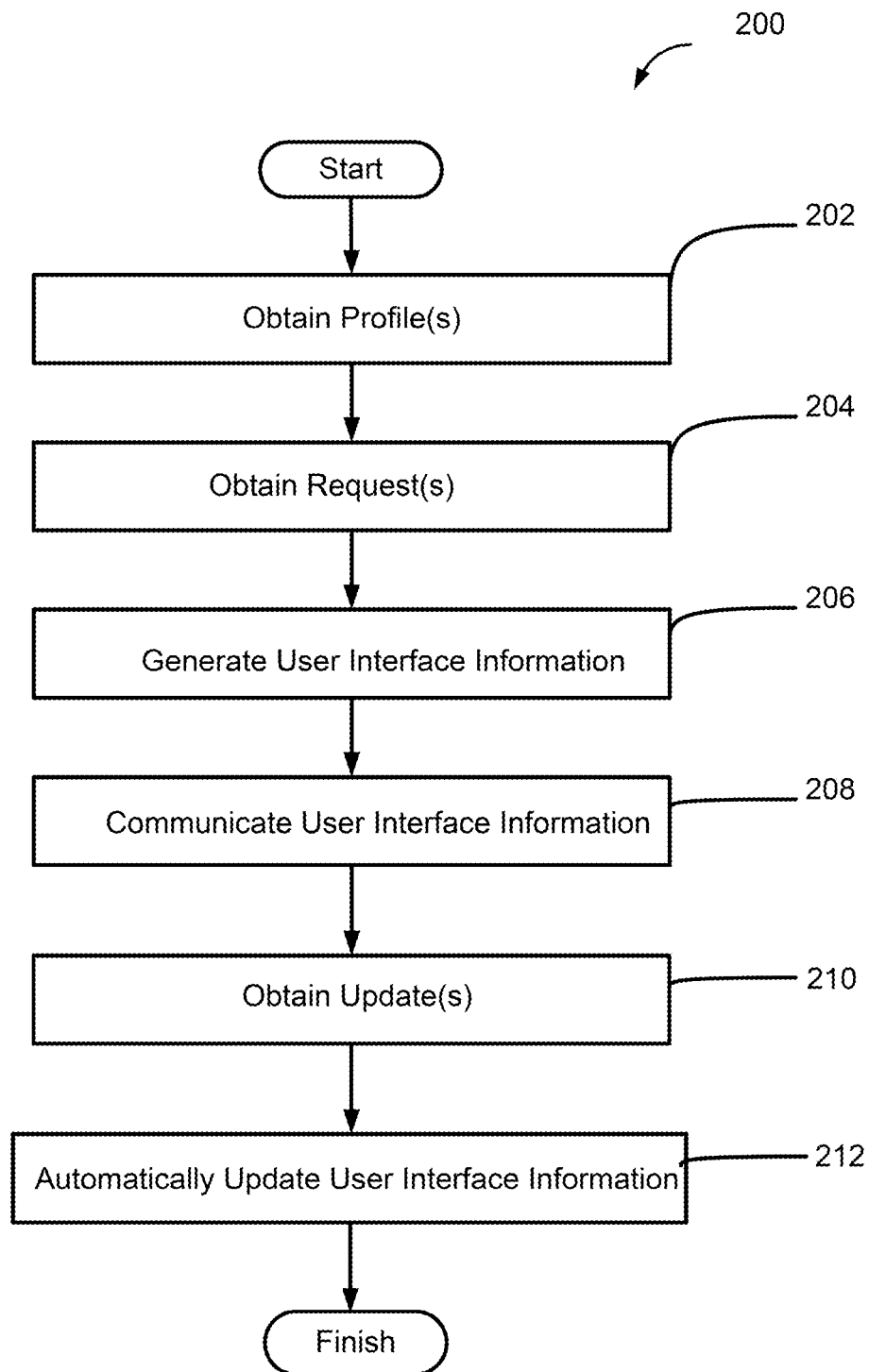
FIG. 2 illustrates a method to facilitate synchronized sharing of centralized authentication information to facilitate entity verification and risk assessment, in accordance with one or more implementation.

FIG. 2 illustrates a method 200 to facilitate synchronized sharing of centralized authentication information to facilitate entity verification and risk assessment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining profiles, and/or other information. The profiles may include user profiles, organization profiles, and/or other profiles. User profiles may be associated with users of the system who are being assessed for risk. Organization profiles may be associated with compliance organizations who are assessing users for risk because the compliance organizations abide by, or otherwise must comply with, jurisdictional regulations and/or organizational standards. In some implementations, a compliance organization may be a bank, while a user may be an individual or business entity who wishes to do business with the bank. Operation 202 may be performed by one or more hardware processors configured by machine-readable instructions including a component that is the same as or similar to profile component 108, in accordance with one or more implementations.

An operation 204 may include obtaining requests to verify and/or assess risk of users. Individual ones of the request may be associated with individual ones of the compliance organizations. Individual ones of the requests may include information identifying individual ones of the user profiles, request criteria, and/or other information. The request criteria may indicate content item types and/or other information that may be required as part of assessment by compliance organizations. The compliance organizations may create customized request for automated risk assessments in accordance with their specific jurisdictional or organizational rules and standards. By way of non-limiting illustration, the requests may include a first request by a first compliance organization, and/or other requests. The first request may identify the first user profile and/or other user profiles. The first request may indicate that a first content item type is required as part of verification and assessment of users by the first compliance organization. Operation 204 may be performed by one or more hardware processors configured by machine-readable instructions including a component that is the same as or similar to request component 114, in accordance with one or more implementations.

An operation 206 may include generating user interface information defining a user interface through which content of the user profiles are accessed by compliance organizations. The user interface may be configured to display one or more of user information, instances of content items, and/or other information from the user profiles. In some implementations, the user interface may display, on computing platforms associated with compliance organizations, the content within the user profiles that satisfy the request criteria of the requests. Accordingly, in some implementations, only the documentation that satisfies the requirements of the requests may be pulled from the database and securely shared with the compliance organizations, while leaving the remaining content of the user profiles secure. By way of non-limiting illustration, the user interface information may define the user interface so that content from the first user profile satisfying the first request may be accessed. By way of non-limiting illustration, the content satisfying the first request may include one or more of the first user information, the first authenticated content item, and/or other content from the first user profile. Operation 206 may be performed by one or more hardware processors configured by machine-readable instructions including a component that is the same as or similar to user interface component 110, in accordance with one or more implementations.

An operation 208 may include effectuating communication of the user interface information to computing platforms associated with the compliance organizations. Reception of the user interface information at the computing platforms may cause the computing platforms to present the user interface displaying content of the user profiles that satisfies the request criteria of the requests. By way of non-limiting illustration, the user interface information may be communicated to a first computing platform associated with the first compliance organization to cause the first computing platform to present the user interface displaying one or more of the first user information, an instance of the first authenticated content item, and/or other content of the first user profile satisfying the first request. Operation 208 may be performed by one or more hardware processors configured by machine-readable instructions including a component that is the same as or similar to user interface component 110, in accordance with one or more implementations.

An operation 210 may include obtaining updates to the user profiles. By way of non-limiting illustration, a first update to the first user profile may be obtained. The first update may include a first change to the first user information to generate updated first user information within the first user profile. The first update may include a second change to the first authenticated content item to generate an updated first authenticated content item. Operation 210 may be performed by one or more hardware processors configured by machine-readable instructions including a component that is the same as or similar to profile component 108, in accordance with one or more implementations.

An operation 212 may include automatically updating the user interface information based on the updates to the user profiles so that the instances of the content displayed in the user interface reflects the updates to the user profiles. By way of non-limiting illustration, responsive to the first update, the user interface information may be automatically updated to cause the user interface presented by the first computing platform and/or other computing platforms to display one or more of the updated first user information, an instance of the updated first authenticated content item, and/or other updated content from the first user profile. If one or more other compliance organizations (e.g., a second compliance organization, a third compliance organization, etc.) also requested information from the first user profile, the user interface presented at computing platforms of the other compliance organizations may be similarly and contemporaneously updated to reflect synchronous updates of information from the first user profile. Operation 212 may be performed by one or more hardware processors configured by machine-readable instructions including a component that is the same as or similar to user interface component 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate synchronized sharing of centralized due diligence information, the system comprising:
    non-transitory electronic storage storing:
        a first user profile for a first user, the first user profile including a first authenticated content item associated with the first user; and
    one or more physical processors configured by machine-readable instructions to:
        obtain a first request submitted by a first compliance organization and a second request submitted by a second compliance organization, the first request identifying the first user profile and indicating a first content item type that is required as part of verification and/or assessment of the first user by the first compliance organization, the second request identifying the first user profile and indicating the first content item type that is required as part of verification and/or assessment of the first user by the second compliance organization;
        effectuate communication of user interface information to a first computing platform associated with the first compliance organization to cause the first computing platform to present a user interface displaying a first instance of the first authenticated content item, and to a second computing platform associated with the second compliance organization to cause the second computing platform to present the user interface displaying a second instance of the first authenticated content item;
        obtain a first update to the first user profile, the first update including a first change to the first authenticated content item to generate an updated first authenticated content item;
        responsive to the first update, automatically update the user interface information to cause the user interface presented by the first computing platform and the second computing platform to display instances of the updated first authenticated content item; and
        wherein the user interface information is configured such that the user interface presented on the first computing platform associated with the first compliance organization includes a risk assessment page, the risk assessment page providing a view of a result of an automated risk assessment of the first user profile based on risk assessment criteria defined by the first compliance organization, wherein the risk assessment page includes a risk indicator conveying at least some of the result, and wherein the risk indicator is a visual display comprising a sliding scale and a slider positioned in the sliding scale to represent an amount of risk.

2. The system of claim 1, wherein the one or more physical processors are further configured by the machine-readable instructions to:
identify the first user profile based on the first request; and
responsive to the first authenticated content item being of the first content item type, determine the first authenticated content item satisfies the first request.

3. The system of claim 2, wherein the one or more physical processors are further configured by the machine-readable instructions to:
responsive to contents of the first user profile not satisfying the first request, generate and deliver a first user request to a third computing platform associated with the first user, the first user request indicating the first content item type is required as part of the first request.

4. The system of claim 1, wherein the user interface is further configured to receive entry and/or selection of request criteria of requests, the user interface including a set of user interface elements corresponding to potential content item types associated with the requests.

5. The system of claim 4, wherein the potential content item types are characterized by document name and/or type.

6. The system of claim 1, wherein the user interface information is configured such that the user interface presented on the first computing platform associated with the first compliance organization includes a status page displaying status of the first request.

7. The system of claim 6, wherein the one or more physical processors are further configured by the machine-readable instructions to:
responsive to the status of the first request being an expired status, generate and deliver a user request to a third computing platform associated with the first user, the user request indicating additional and/or updated content that is required in the first user profile.

8. The system of claim 1, wherein the first compliance organization is a financial institution, and the first user is an individual person or a business entity.

9. The system of claim 1, wherein the one or more physical processors are further configured by the machine-readable instructions to:
generate second user interface information defining a second user interface through which the first user manages the first user profile; and
effectuate communication of the second user interface information to a third computing platform associated with the first user to cause the third computing platform to present the second user interface.

10. The system of claim 9, wherein the second user interface includes: a profile page through which the first user accesses the first user profile, a request status page displaying status of the first request and the second request, and document status page displaying status of the first authenticated content item.

11. A method to facilitate synchronized sharing of centralized due diligence information, the method comprising:
obtaining a first user profile for a first user, the first user profile including a first authenticated content item associated with the first user;
obtaining a first request submitted by a first compliance organization and a second request submitted by a second compliance organization, the first request identifying the first user profile and indicating a first content item type that is required as part of verification and/or assessment of the first user by the first compliance organization, the second request identifying the first user profile and indicating the first content item type that is required as part of verification and assessment of the first user by the second compliance organization;
effectuating communication of user interface information to a first computing platform associated with the first compliance organization to cause the first computing platform to present a user interface displaying a first instance of the first authenticated content item, and to a second computing platform associated with the second compliance organization to cause the second computing platform to present the user interface displaying a second instance of the first authenticated content item;
obtaining a first update to the first user profile, the first update including a first change to the first authenticated content item to generate an updated first authenticated content item;
responsive to the first update, automatically updating the user interface information to cause the user interface presented by the first computing platform and the second computing platform to display instances of the updated first authenticated content item; and
wherein the user interface information is configured such that the user interface presented on the first computing platform associated with the first compliance organization includes a risk assessment page, the risk assessment page providing a view of a result of an automated risk assessment of the first user profile based on risk assessment criteria defined by the first compliance organization, wherein the risk assessment page includes a risk indicator conveying at least some of the result, and wherein the risk indicator is a visual display comprising a sliding scale and a slider positioned in the sliding scale to represent an amount of risk.

12. The method of claim 11, further comprising:
identifying the first user profile based on the first request; and
responsive to the first authenticated content item being of the first content item type, determining the first authenticated content item satisfies the first request.

13. The method of claim 12, further comprising:
responsive to contents of the first user profile not satisfying the first request, generating and delivering a first user request to a third computing platform associated with the first user, the first user request indicating the first content item type is required as part of the first request.

14. The method of claim 11, wherein the user interface is further configured to receive entry and/or selection of request criteria of requests, the user interface including a set of user interface elements corresponding to potential content item types associated with the requests.

15. The method of claim 14, wherein the potential content item types are characterized by document name and/or type.

16. The method of claim 11, wherein the user interface information is configured such that the user interface presented on the first computing platform associated with the first compliance organization includes a status page displaying status of the first request.

17. The method of claim 16, further comprising:
responsive to the status of the first request being an expired status, generating and delivering a user request to a third computing platform associated with the first user, the user request indicating additional and/or updated content that is required in the first user profile.

18. The method of claim 11, wherein the first compliance organization is a financial institution, and the first user is an individual person or a business entity.

19. The method of claim 11, further comprising:
generating second user interface information defining a second user interface through which the first user manages the first user profile; and
effectuating communication of the second user interface information to a third computing platform associated with the first user to cause the third computing platform to present the second user interface.

20. The method of claim 19, wherein the second user interface includes: a profile page through which the first user accesses the first user profile, a request status page displaying status of the first request and the second request, and document status page displaying status of the first authenticated content item.

* * * * *